United States Patent [19]

Culbert et al.

[11] 4,177,050
[45] Dec. 4, 1979

[54] AIR FILTER ASSEMBLY

[75] Inventors: Robert M. Culbert, Manhattan Beach; Robert R. Raber, Jr., Los Alamitos, both of Calif.

[73] Assignee: Farr Company, Los Angeles, Calif.

[21] Appl. No.: 903,204

[22] Filed: May 5, 1978

Related U.S. Application Data

[63] Continuation of Ser. No. 716,644, Aug. 23, 1976, abandoned.

[51] Int. Cl.² .............................................. B01D 46/02
[52] U.S. Cl. ........................................ 55/499; 55/521; 55/DIG. 31
[58] Field of Search ................................. 55/497–500, 55/521, DIG. 31; 210/493

[56] References Cited

U.S. PATENT DOCUMENTS

| 1,830,096 | 11/1931 | Dollinger | 55/500 |
| 2,058,669 | 10/1936 | Dollinger | 55/499 |
| 2,071,806 | 2/1937 | Walker | 55/499 |
| 2,135,863 | 11/1938 | Walker | 55/499 |
| 2,364,573 | 12/1944 | Vokes | 55/500 |
| 3,234,717 | 2/1966 | Korn | 55/499 |
| 3,853,529 | 12/1974 | Boothe et al. | 55/499 |

Primary Examiner—Bernard Nozick
Attorney, Agent, or Firm—Lyon & Lyon

[57] ABSTRACT

Disclosed herein is an air filter assembly particularly adapted for use in building air conditioning systems. The assembly is comprised of an open ended housing defining an air inlet and an air outlet and having a continuous layer of pleated filtering media extending thereacross and a plurality of pleat support members disposed at the air inlet and outlet ends of the filter housing.

3 Claims, 6 Drawing Figures

U.S. Patent  Dec. 4, 1979  Sheet 1 of 2  4,177,050
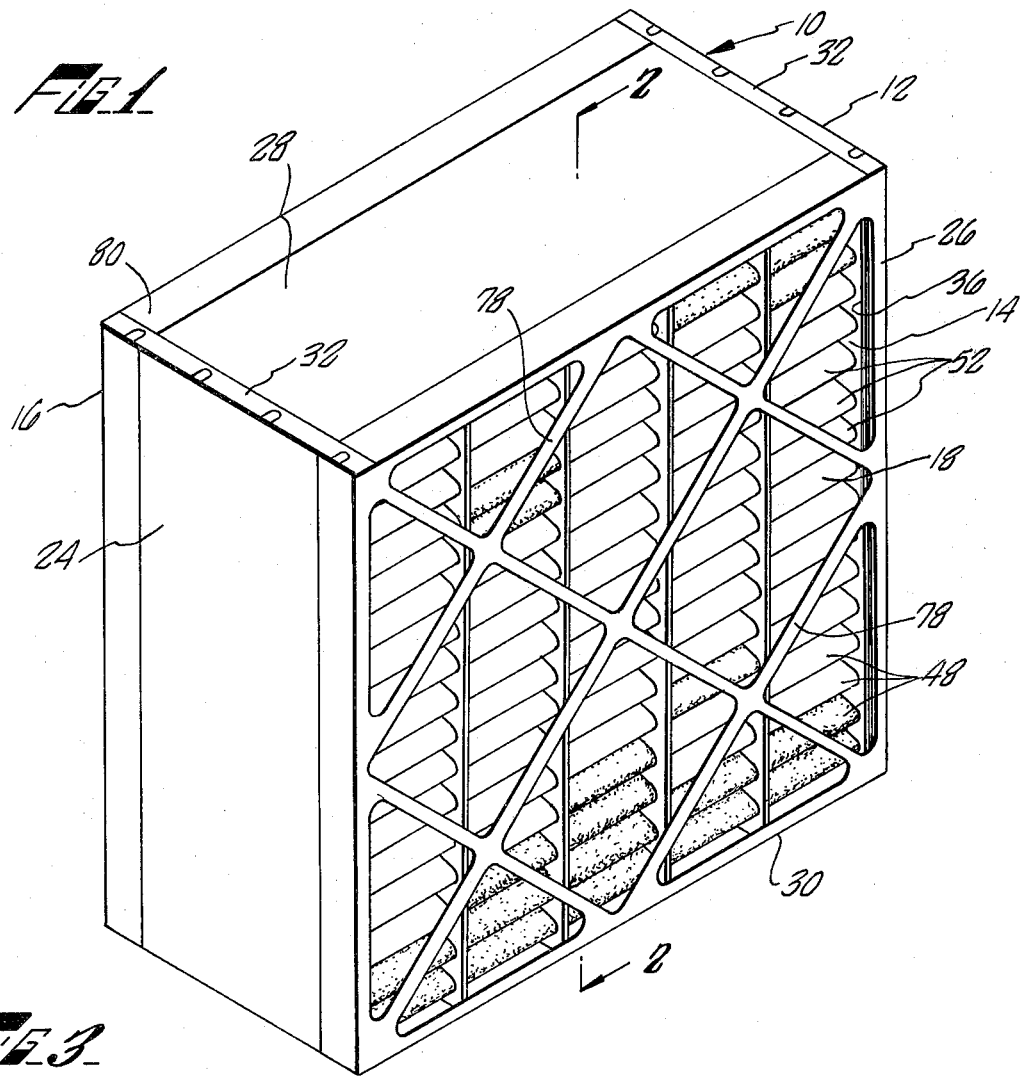
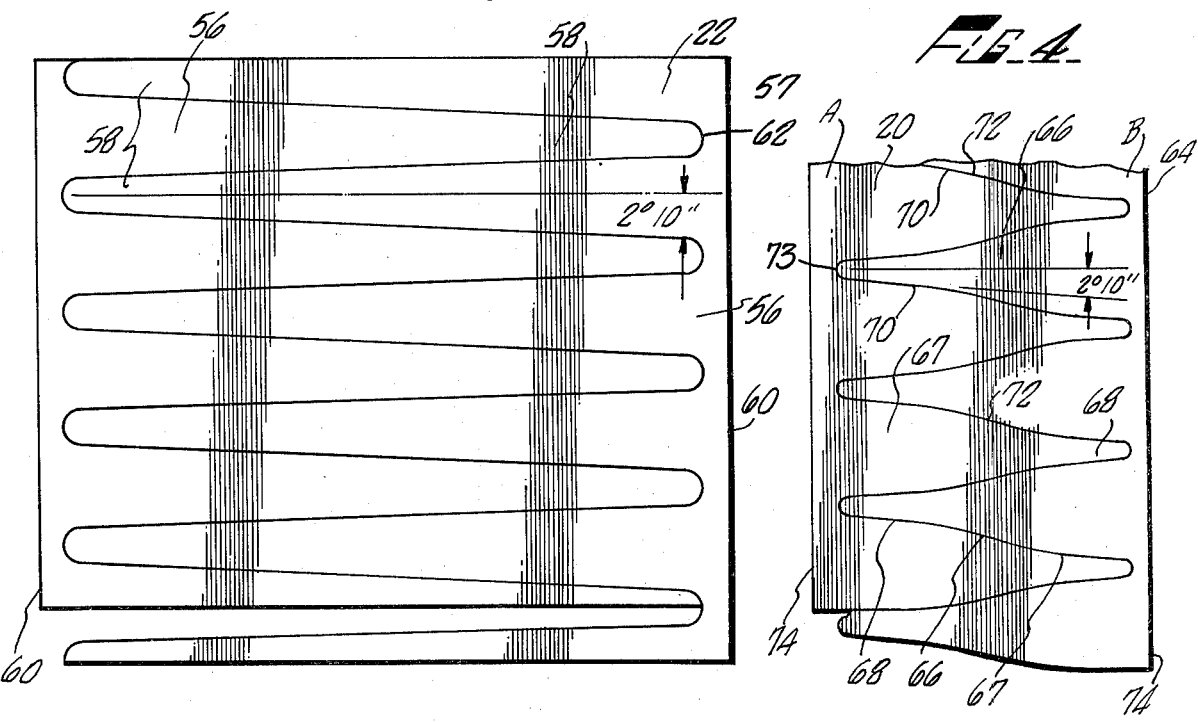

AIR FILTER ASSEMBLY

This is a continuation of application Ser. No. 716,644, now abandoned filed Aug. 23, 1976.

BACKGROUND OF THE INVENTION

In most air conditioning and air supply systems, it is generally desirable to filter some of the foreign materials such as dust or dirt particles out of the air which is being supplied to the system. The amount of foreign material desired to be extracted from the incoming air or correspondingly the amount of foreign material which is tolerable in the particular air conditioning or supply system will dictate the particular type of filtering media which must be used. If only relatively large particles need to be eliminated, a filter utilizing wire screen media may be adequate, whereas if relatively fine dust particles must be removed from the incoming air, the filtering media must normally consist of such materials as cloth-backed cotton, polyurethane foam, glass fiber media, spun nylon and the like. It is the filtration of these finer particles with which the filter herein described is concerned.

A common problem in the filtration of air is that the foreign material extracted from the incoming air accumulates and the filtering media eventually becomes sufficiently clogged or loaded with dirt that its resistance to air flow becomes excessive. When this occurs, the media must be either replaced or cleaned. This problem is aggravated in the case of filter media of the types described which are effective for the finer dirt particles. With most types of such media, it is impractical to clean the same and it has therefore become relatively common to use inexpensive disposable filters.

Filtering materials which provide reasonable efficiency in the removal of the relatively finer foreign particles have relatively high resistance to the flow of air therethrough. As a result, it is generally desirable to provide an area filtering media for the air to flow through which is greater than the area of the air inlet duct to the air conditioning or supply system. To accomplish this, it is common practice to corrugate or pleat the filtering media thereby increasing the area of filtering media through which the air may flow. Most types of filtering media which are effective against finer dirt particles are not sufficiently rigid, however, to be self-supporting in this corrugated or pleated configuration, with the result that some apparatus must be supplied to support the filtering media.

More efficient filtering of relatively fine foreign particles and increased filter life can be obtained with the use of high loft micro glass fibers as a filtering media than with the thinner, higher density water-laid glass media due to the increased dust holding capacity of the high loft material which allows the filter to hold more particulate matter without a significant increased pressure drop. Because of the lack of self-support and the relatively high loft of this type of media, great difficulty is encountered in attempting to utilize such media in a pleated configuration.

The efficiency of the filter can be further increased by increasing the depth of the pleats and consequently the filter assembly to correspondingly increase the amount of filtering media through which the air may flow. However, such a modification renders the problem of supplying supporting apparatus for a filter assembly incorporating high loft filtering media even more acute.

In supporting the filtering media the supporting apparatus defines to a large extent the inlet and outlet openings of the filter and consequently has a great effect on the filter's efficiency. With the thinner, higher density material, a plurality of corrugated separators can be employed which extend parallel to and between the pleats to maintain the desired configuration of the pleats. However, if such separators were used with the high loft filtering media, the separators would press into the softer material distorting the pleated configuration and interfere with the air flow therethrough.

Another means of supporting the pleats which has been employed in filters using the denser and thinner media is the use of wire grids. While a wire grid may be adequate as a sole supporting member in relatively narrow filter assemblies, they have proved unsatisfactory for use in supporting deep pleats of high loft filtering media as they lack the structural strength to maintain the configuration of a pleat of about 12 inches in depth and if the individual wires are too closely spaced they tend to overly compress the filtering media held therebetween and thereby largely eliminate the advantage of the high loft filtering media. If the grid pattern were enlarged to avoid compression of the filtering media and constructed of a sufficient gauge to provide the necessary structural strength to maintain the pleated configuration during use of the filter assembly, the grid supporting structure could not be economically secured to the filter media without tearing the media and severely damaging the assembly.

Another means which has been used to support pleated filtering media is to suspend the media, which is provided with a relatively light gauge wire web backing, in a pleated configuration in a collapsible frame. The frame and media are then inserted into a rigid housing which includes a sinuous wire support which is disposed on one side of the media. Unlike the methods discussed above, this configuration is suitable for use with deep pleats of high loft filtering media. However, it has several shortcomings when so used. To facilitate assembly, the wires comprising the support are not closely spaced as in a wire grid. Consequently, some billowing of the media occurs during use which obstructs the air flow therethrough. In addition, the use of a one-sided support exclusive of the thin wire backing which merely gives a slight element of rigidity to the media, does not provide sufficient control over the configuration of the individual pleats and consequently restricts the number of pleats which can be incorporated in a given area. Due to this lack of control, additional pleats would cause continual distortion of the air inlet and outlet openings defined by the pleats and a drop in efficiency. Accordingly, the number of pleats and area of filter media is reduced. The combination of reduced media and less support produces a less efficient filter.

SUMMARY OF THE INVENTION

Briefly, the invention comprises a filter assemby for removing fine dust particles from an air flow which includes an open ended housing defining an air inlet and air outlet, a continuous length of pleated high loft glass fiber filter media extending thereacross and a plurality of pleat supporting members disposed at the air inlet and air outlet ends of the housing which closely maintain the contour of the individual pleats of filtering media so that an increased number of pleats can be employed within the housing without distortion upon subjecting the assembly to air flow therethrough.

It is the principal object of the present invention to provide a novel form of self-contained pleated air filter employing high loft filtering media.

It is another object of the present invention to provide a pleated air filter having an increased area of high loft filtering media for a given volume of air flow therethrough.

It is yet another object of the present invention to provide a pleated air filter employing high loft filtering media which defines and maintains large air inlet and outlet openings between the individual pleats.

It is a further object of the present invention to provide a pleated air filter employing high loft filtering media which maintains its pleated configuration during use.

It is a still further object of the present invention to provide a pleated air filter employing high loft filtering media which is sufficiently inexpensive to be disposable.

These and other objects of the present invention will become apparent from the following detailed description taken in conjunction with the accompanying drawings.

IN THE DRAWINGS

FIG. 1 is a perspective view of the filter assembly.

FIG. 3 is a plan view of a sheet of material from which a pair of downstream contour stabilizers are cut illustrating the symmetry of the stabilizers.

FIG. 4 is a plan view of a sheet of material from which a pair of upstream contour stabilizers are cut illustrating the symmetry of the stabilizers.

Figure 5:
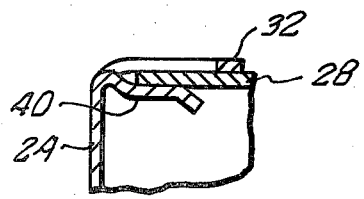
FIG. 5 is a partial sectional view illustrating the means by which the filter housing is constructed.
Figure 6:
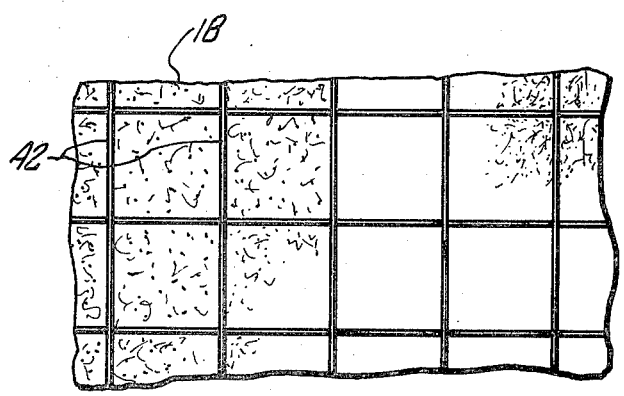
FIG. 6 is a partial view of the backside of the filtering material illustrating the wire grid backing.

Referring now in detail to the drawings, the filtering assembly 10 is comprised of an open ended housing 12 defining an air flow inlet end 14 and air outlet end 16, pleated filtering media 18, a plurality of upstream pleat support members 20 and a plurality of downstream pleat support members 22. The housing 12 includes a pair of side panels 24 and 26, a top panel 28 and a bottom panel 30. To form the housing, the side panels are provided with upper and lower flange portions 32 and 34 and forward and rear flange portions 36 and 38. The upper and lower flange portions are each provided with a plurality of tabs 40. In the constructed housing the upper and lower flange portions of the side panels extend over the top and bottom panels respectively while the tabs 40 are disposed on the interior side of the top and bottom panels, as seen in FIG. 5. The shorter front and rear flanges on the side panels are disposed forwardly and rearwardly of the top and bottom panels and act to hold the pleated filtering media 18 in place within the housing 12 and provide a mounting surface for the inlet and outlet exterior grids 78 and 80.

Figure 2:
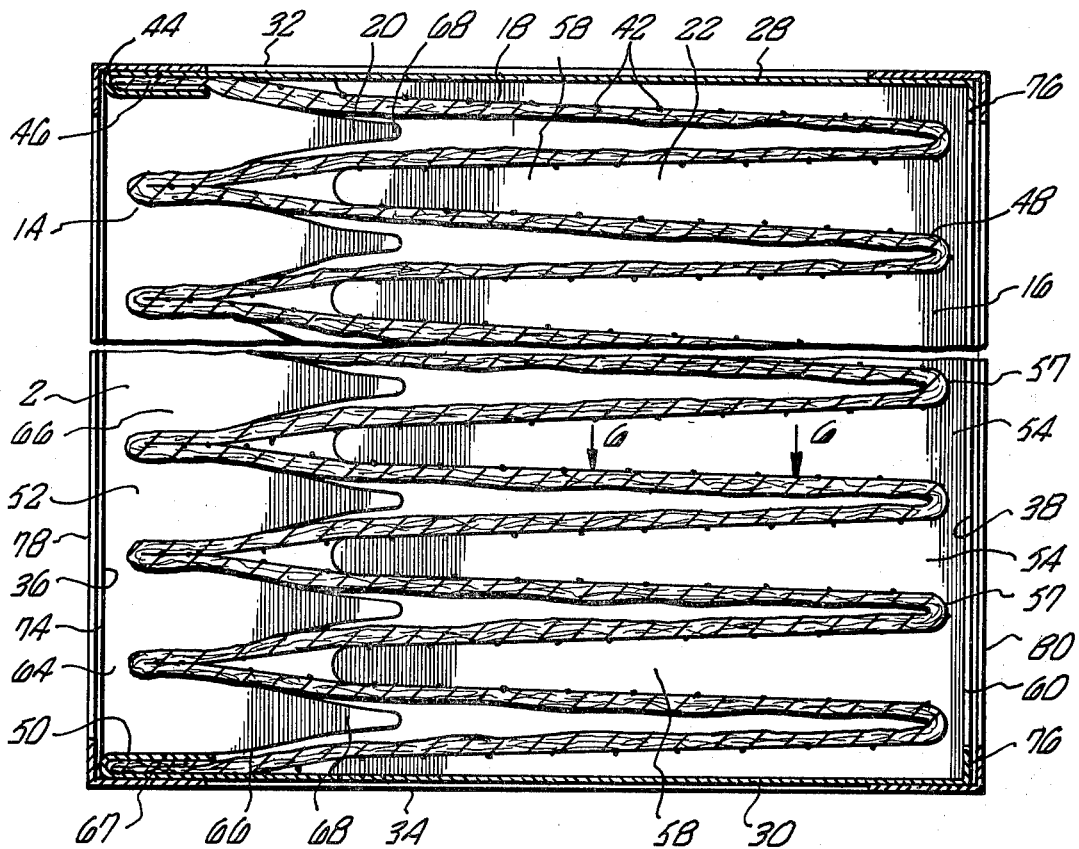
FIG. 2 is a sectional view taken along line 2—2 of FIG. 1.

The filtering media 18 is a continuous sheet of high loft micro glass fiber media (about 0.2 inches in thickness) bonded with a thermal setting resin and provided with a thin non-woven nylon backing which is held to the media by a suitable adhesive such as poly vinyl acetate. To add some structural strength to the pleated filtering media a thin wire grid 42 preferably constructed of about 25 gauge wire and defining one inch square apertures is secured to the backside of the media exteriorly of the nylon. A poly vinyl acetate adhesive has also been found well suited for this use. As seen in FIG. 2, the media is secured at one end thereof to the upstream end 44 of the top panel 28 by means of a flange 46 which is integrally formed with the top panel and which lightly presses against the media to secure the media in place with the wire reinforced backside of the media facing the underside of the top panel and that portion of the media disposed between the top panel 28 and flange 46 being bent back upon itself.

From flange 46, the media follows a sinuous path to define a plurality of pleats 46 which extend between the side walls of the housing from the air inlet 14 and to the air inlet end 16. The media is secured to the bottom panel 30 by flange 50 in the same manner as the media is secured to the top panel 28. In this configuration, the media defines a plurality of air inlet openings 52 between the individual pleats 48 at the air inlet end of the housing and a corresponding plurality of air outlet openings 54 at the air outlet end of the housing. In the preferred configuration of the filter assembly 10, the media defines eight pleats to the linear foot and the inlet and outlet openings are about one inch wide to provide adequate air flow therethrough without incurring a sizeable pressure drop while exposing a maximum area of filter media to the air flowing through the filter housing. To secure the ends of the pleated filtering media to the side walls, a thick adhesive is preferably applied to the interior of the side walls to form a bond between the walls and the pleated filtering media to hold the media in place and prevent any air leakage along the interior of the side walls. Poly vinyl acetate in a thixotropic state provides a suitable adhesive for this purpose.

To maintain the desired pleat configuration which provides a maximum inlet area for the air flow, maximum outlet area for air flow and a maximum area of filtering media exposed to the flowing air, upstream pleat contour stabilizers 20 and downstream pleat contour stabilizers 22 are provided, without which the pleats would tend to distort during use and decrease the efficiency of the filter. As best seen in FIGS. 2 and 3, the downstream stabilizers 20 are each comprised of a spine or web portion 56 which is disposed at the downstream end of the housing and extends transversely of the pleats 48 and a plurality of finger portions 58 which extend inwardly of the housing from the web between and in contact with the backside of the pleats. The juncture 57 of the web and finger portions of the downstream stabilizers are rounded and define the countour of the downstream ends of the pleats and air outlet openings 54.

The upstream pleat contour stabilizers 20, best seen in FIGS. 2 and 4, are disposed at the upstream end of the housing and correspond in number and positioning to the downstream stabilizers. Each upstream stabilizer is comprised of a spine or web portion 64 and plurality of support wedges 66 extending from the web portion of the stabilizer between and in contact with the pleats of the filtering media. Each wedge portion has an enlarged base portion 67 which terminates in an extended finger portion 68.

By way of example, the filter assembly 10 is about 24 inches square for use in standard ducting and conventional air conditioning systems and 11.5 inches in depth to increase the area of filter media within the housing. Six downstream and upstream pleat contour stabilizers are preferably employed so as not to overly compress the media but provide adequate pleat support to prevent distortion during use. Each finger portion of the downstream stabilizers extends about 8.72 inches into the housing from the rearward edge 60 of the web at a taper of about 2° 10' and defines a rounded extended end 62 having a radius approximately equal to the thickness of the filtering media (0.2 inches).

As with the downstream stabilizers, the base portion and finger portions of the upstream stabilizers have a taper of about 2° 10' to continuously maintain the contour of the pleats and are joined by opposite full radius curved surfaces 70 and 72. These surfaces not only provide a smooth transition from the base portions of the stabilizers to the finger portions but half the cost of the construction of the stabizers by completing the symmetry of each of the wedges which generate two stabilizers A and B from a single outing or stamping from a single sheet of material as seen in FIG. 4. The downstream stabilizers are provided with a similar symmetry to further reduce the cost of construction as illustrated in FIG. 3. The finger portions 68 of the upstream stabilizers preferably extend about 4.25 inches from the forward edge 74 of the web and defines rounded extended ends 73 which are of smaller radius than ends 62 of the upstream stabilizers. Due to the symmetrical construction of the stabilizers illustrated in FIGS. 3 and 4, the smaller radius of rounded end 73 acts depress the filtering media therein together as illustrated in FIG. 2. It has been found that the upstream and downstream pleat stabilizers having the aforesaid configurations and dimensions when disposed in the housing 12 as shown in the drawings continually maintain the pleats 48 of filtering media in the desired configuration and provide a highly efficient filter assembly.

While the above dimensions are by way of example, it should be noted that while the depth of the filter is preferably about 12 inches, it could be as small as about 5 or 6 inches and as great as about 24 inches. The conventional wire grid supports discussed at length above are capable of adequately supporting pleated material in filters up to about 4 inches and while the stabilizers could support the media beyond a depth of 24 inches, a pressure drop of more than one inch of water is considered undesirable in most conventional air conditioning systems, which limit might be exceeded were the depth of the filter assembly to be further increased.

To complete the construction of the assembly, the top and bottom panels 28 and 30 are provided with short flange portions 76 which extend inwardly of the air outlet end 16 of the housing over a portion of the spines of the downstream stabilizers (see FIG. 2). A pair of exterior grids 78 and 80 which are preferably constructed of cardboard disposed over the air inlet and outlet ends of the housing to provide additional angular rigidity to the structure as well as to enhance the appearance of the filter assembly. A portion of each grid is folded over the side, top and bottom panels, as seen in FIG. 1, and secured thereto with a suitable adhesive.

Various changes and modifications may be made in carrying out the present invention without departing from the spirit and scope thereof. Insofar as these changes and modifications are within the purview of the appended claims they are to be considered as part of the invention.

I claim:

1. A filter assembly comprising an open ended walled housing of at least five inches in depth and defining an inlet end and an outlet end for the passage of air therethrough, a continuous length of high loft filtering media disposed within said housing and extending between opposite side walls thereof in a pleated configuration wherein each of the pleats defined by said media extend substantially from said inlet end to said outlet end of said housing defining a plurality of elongated air inlet openings between said pleats at said inlet end of said housing and a plurality of elongated air outlet openings between said pleats at said outlet end thereof, said pleats being supported solely by a grid backing affixed to said media and first and second pluralities of pleat support members, the first plurality of pleat support members being disposed at said inlet end of said housing, each of said members having a web portion and a plurality of tapered finger portions extending from said web portion, the ends of the fingers joining the web portion along a first radius of curvature inwardly of said housing between the pleats defined by said media, the second plurality of pleat support members being disposed at said outlet end of said housing, each of said second plurality of support members having a web portion and a plurality of tapered finger portions extending from said web portion, the ends of the fingers joining the web portion along a second radius of curvature inwardly of said housing between said pleats, said second radius of curvature being larger than said first radius of curvature such that the portions of said media disposed between adjacent inlet openings is pressed together to increase the area of said inlet openings and the portions of said media disposed between adjacent outlet openings is spaced apart to increase the area of filtering media exposed to air flow through said housing and said tapered finger portions of said first and second pluralities of support members defining a segmented inclined support surface pressing against said filtering media and maintaining said media configuration upon directing a flow of air through said housing.

2. A filter assembly comprising an open ended housing defining an inlet end and an outlet end for the passage of air therethrough, a continuous length of high loft filtering media disposed within said housing and extending between opposite side walls thereof and a pleated configuration wherein each of the pleats defined by said media extends substantially from said inlet to said outlet end of said housing, a first plurality of pleat support members disposed in said housing at said inlet end thereof, each of said members having a web portion and a plurality of tapered finger portions, each of said web portions extending across said inlet end of said housing and each of said finger portions extending from said web portion along a first radius of curvature inwardly of said housing between the pleats defined by said media, and a corresponding second plurality of pleat support members disposed in said housing at said outlet end thereof, each of said second plurality of support members having a web portion and a plurality of tapered finger portions, each of said web portions extending across said outlet end of said housing and each of said finger portions extending from said web portions along a second radius of curvature inwardly of said housing between said pleats, said second radius of curvature being larger than said first radius of curvature and said first and second pluralities of pleat members defining a segmented inclined support surface pressing against said filtering media and maintaining said media configuration upon directing a flow of air through said housing.

3. The combination of claim 2 including a grid backing affixed to said media, said grid backing and said first and second pluralities of pleat support members defining the sole support for said pleats between said inlet and outlet ends of said assembly.

* * * * *